United States Patent
Kaman

[11] Patent Number: 5,844,473
[45] Date of Patent: Dec. 1, 1998

[54] METHOD AND APPARATUS FOR REMOTELY COLLECTING OPERATIONAL INFORMATION OF A MOBILE VEHICLE

[75] Inventor: Richard A. Kaman, Spring Grove, Ill.

[73] Assignee: Products Research, Inc., Addison, Ill.

[21] Appl. No.: 420,675

[22] Filed: Apr. 12, 1995

[51] Int. Cl.$^6$ .................................................. B60Q 1/00
[52] U.S. Cl. .......................... 340/439; 340/461; 340/992; 701/32; 701/35; 701/213; 455/404; 455/422; 455/517
[58] Field of Search ..................................... 340/438, 439, 340/459, 461, 992; 455/33.1, 88, 517, 404, 422; 701/213, 29, 30, 31, 32, 35, 36

[56] References Cited

U.S. PATENT DOCUMENTS

| | | | |
|---|---|---|---|
| 4,009,375 | 2/1977 | White et al. | 364/436 |
| 4,926,331 | 5/1990 | Windle et al. | 364/424.04 |
| 5,058,044 | 10/1991 | Stewart et al. | 364/551.01 |
| 5,157,610 | 10/1992 | Asano et al. | 364/424.03 |
| 5,227,766 | 7/1993 | Endo | 340/635 |
| 5,257,190 | 10/1993 | Crane | 364/424.03 |
| 5,282,386 | 2/1994 | Niemczyk et al. | 73/292 |
| 5,315,520 | 5/1994 | Drake et al. | 364/424.03 |
| 5,353,023 | 10/1994 | Mitsugi | 364/424.04 |
| 5,365,436 | 11/1994 | Schaller et al. | 340/459 |
| 5,394,136 | 2/1995 | Lammers et al. | 340/438 |
| 5,442,553 | 8/1995 | Parrillo | 379/59 |
| 5,513,111 | 4/1996 | Wortham | 379/59 |
| 5,533,019 | 7/1996 | Jayapalan | 370/60.1 |
| 5,539,810 | 7/1996 | Kennedy, III et al. | 340/992 |
| 5,550,738 | 8/1996 | Bailey et al. | 340/459 |

FOREIGN PATENT DOCUMENTS

| | | |
|---|---|---|
| 34660 | 10/1991 | Japan . |
| 2263376 | 2/1992 | United Kingdom . |

*Primary Examiner*—Daniel J. Wu
*Attorney, Agent, or Firm*—Welsh & Katz, Ltd.

[57] ABSTRACT

An apparatus for remotely collecting and reporting an indicia of use of a vehicle. The apparatus includes an accumulator of the indicia of vehicle use operably coupled to the vehicle and a transceiver coupled to the accumulator and responsive to a received information request for transmitting the indicia of vehicle use.

24 Claims, 1 Drawing Sheet

METHOD AND APPARATUS FOR REMOTELY COLLECTING OPERATIONAL INFORMATION OF A MOBILE VEHICLE

FIELD OF THE INVENTION

The field of the invention relates to methods of monitoring mobile vehicles and more particularly to methods of collecting operational information of mobile vehicles.

BACKGROUND OF THE INVENTION

The need to collect operational information on mobile vehicles is well known. Recommended vehicular maintenance procedures are typically tied to vehicular use. The more a vehicle is used the more frequently the vehicle must be serviced.

Vehicle use is typically measured in terms of one of two parameters (miles or operating hours) providing indicia of usage. If the vehicle is a highway vehicle, then use is typically measured in terms of miles driven. If the vehicle is a lift truck or heavy equipment, then use is typically measured in hours of operation.

In small organizations where a single operator is assigned to a vehicle, the problem of vehicle maintenance may be trivial. The single operator assigned to the vehicle is made responsible for determining the need for maintenance and the obligation of reporting such requirements to a maintenance support staff. The operator is typically given a maintenance schedule (typically supplied by the vehicle manufacturer) and is assigned the responsibility of determining when the level of usage meets certain maintenance criteria.

In somewhat larger organizations where more than one operator is assigned to a vehicle, one of the operators may be assigned the same responsibility. In such organizations, records of maintenance may even stay, and be stored, within the vehicle.

In still larger organizations, many operators may use a given vehicle within a given time period without any one operator being assigned to any given vehicle. In such organizations, central record-keeping (e.g., computer based) may become necessary to keep track of the need for vehicular maintenance. Where central record keeping is used, it becomes necessary for a designated person (i.e., a clerk) to remotely collect information from each vehicle for entry into the central record. Often the clerk will be assigned the responsibility of inspecting the vehicles and recording a reading of a vehicle hour meter (Hobbes meter) or odometer during an idle period at night or during a weekend. The scheduling of maintenance is then performed based upon the observations of the clerk or upon comparison of the recorded indicia of use with manufactured supplied maintenance recommendations.

The effectiveness of a successful vehicle maintenance program is dependant upon reliable monitoring of the vehicle indicia of use. Reliable monitoring of vehicle usage, on the other hand, is dependent upon ready access to the vehicles. In some organizations, mobile vehicles are constantly in use, seven days a week. Further, the vehicles may not be stored in a common location or other organizations may borrow vehicles for short or extended periods. Even where ready access is available, errors often occur in recording data by a maintenance clerk. Because of the importance of vehicular maintenance, a need exists for a better method of collecting information on vehicle usage.

SUMMARY OF THE INVENTION

Accordingly it is an objective of the invention to provide a means of remote data collection that is not dependent upon vehicle location.

It is a further objective of the invention to provide a means of data collection that is simple and not subject to high costs in its own right.

These and other objects are provided in an apparatus for remotely collecting and reporting an indicia of use of a vehicle. The apparatus includes an accumulator of the indicia of vehicle use operably coupled to the vehicle, and a transceiver coupled to the accumulator and responsive to a received information request for transmitting the indicia of vehicle use.

The indicia of use may be either miles driven or hours of use. The accumulator may therefore be a timer or an indication of an odometer reading.

The transceiver may be a cellular device receiving information requests and transmitting information responses through a local cellular base site. A common indicia of use information collection system is provided for requesting and for collecting information supplied by the remote apparatus.

DETAILED DESCRIPTION OF A PREFERRED EMBODIMENT

Figure 1:
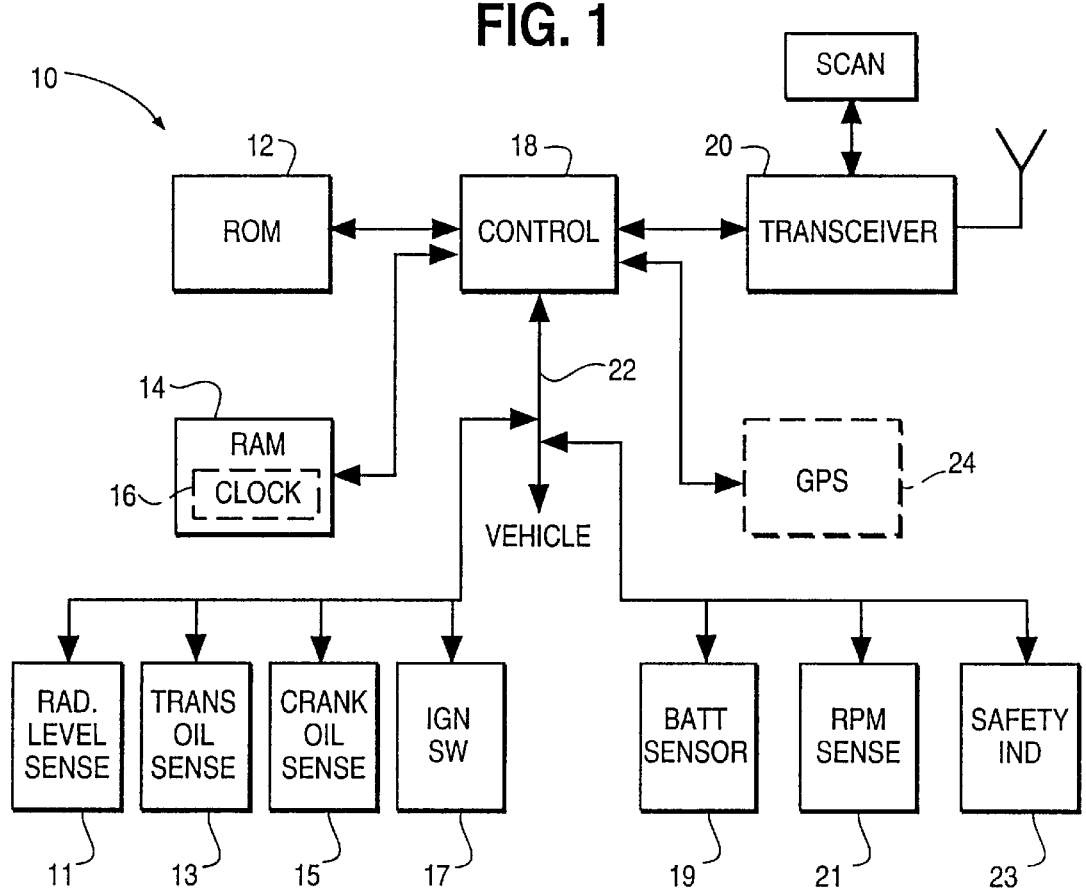
FIG. 1 is a block diagram of a vehicle mounted data collection unit in accordance with an embodiment of the invention.
Figure 2:
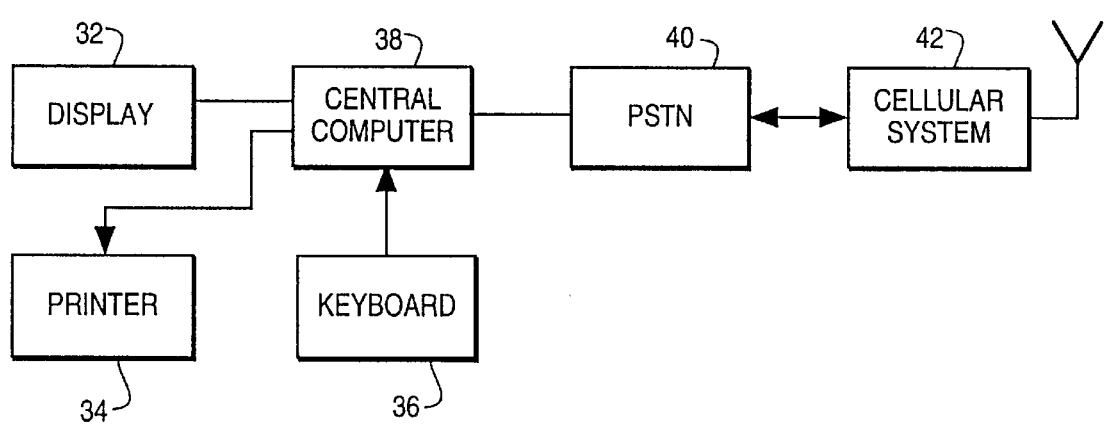
FIG. 2 is a block diagram of a central data collection unit for collecting information supplied by the vehicle mounted data collection units of FIG. 1.

FIG. 1 is a block diagram of a mobile vehicle data collection unit 10, generally, in accordance with an embodiment of the invention. Included within the data collection unit 10 is a transceiver 20 for transmitting vehicular information from the data collection unit 10 to a central data collection unit computer 38 (FIG. 2) through a cellular system 42. The central data collection unit computer 38 may be interconnected with the cellular system 42 through a public switch telephone network (PSTN) 40 as shown in FIG. 2 or through leased lines.

Under the embodiment, a central computer 38 operating through the PSTN 40 and cellular system 42 forms a stationary portion (central data collection unit) 30 of a central maintenance support system that may include a number of data collection units 10, each mounted within a supported vehicle. The central data collection unit 30 and data collection units 10 together form a maintenance control system for the supported vehicles.

Each vehicle data collection unit 10 contains a controller 18 for collecting and formatting information received through the vehicle interface 22, and memory units 12, 14 for storing information. The memory 12, 14 includes a random access memory (RAM) 14 for storing information collected through the vehicle interface 22 and also a read only memory (ROM) 12 for storing operating software used by the controller 18. The RAM 14 also contains an internal clock 16 for accumulating indicia of vehicle operating time.

The vehicle collection unit 10 contains a transceiver 20 for transmitting information to the central data collection unit 30. An optional global position sensor 24 is also shown in FIG. 1.

FIG. 2 is a block diagram of a central data collection unit 30, generally, in accordance with the embodiment. Under the embodiment, a computer 38 correlates and collects maintenance information (e.g., indicia of usage) on a number of vehicles and provides maintenance recommendations via the display 32 and printer 34. In administering maintenance records, the computer 38 contains a file for each vehicle which includes a most recent usage report and could include usage history and other service records.

The computer 38 also contains (stored within the file for each vehicle) a vehicle identifier (ID) of each data collection unit 10. Using an ID of an appropriate data collection unit 10, the computer 38 may access any data collection unit 10 within the maintenance control system at any time through the local public service telephone network (PSTN) 40 and cellular network 42. Access is provided to a particular vehicle collection unit 10 by a transmitted access request containing the ID from the computer 38 through the cellular system 42 and PSTN 40. The request uniquely identifies the data collection unit 10 and causes the data collection unit 10 to respond with transmissions containing an information response directed back to the central computer 38, through the cellular system 42.

Under the embodiment, the central data collection unit 30 and vehicle data collection system 10 may exchange data through the cellular system 42 under a cellular digital packet data (CDPD) format. For technical information on CDPD, the reader is referred to the CDPD Forum, 401 N. Michigan Ave., Chicago, Ill. 60611 and to the CDPD specifications.

Data exchange between the central data collection unit 30 and vehicle data collection unit 10 may occur under any of a number of different protocols and communication systems. Other Examples include the packet switching network offered by RAM Mobile Data of 745 Fifth Avenue, New York, N.Y. 10151 or communications under the ARDIS system jointly developed by IBM and Motorola, Inc.

Under the CDPD format, the ID of the vehicle data collection unit 10 is an Internet Protocol (IP) address and not a telephone number. The use of an IP address (transmitted within the packet) allows for very rapid exchange of information. The rapid exchange also allows the CDPD system to substantially reduce access fees and to instead, charge based upon the number of bits transmitted within a time period. The minimal size of vehicle indicia of use files allows the maintenance systems to be administered through the CDPD system at minimal cost.

Under CDPD, transceivers 10, 42 use unoccupied channels of a local cellular system. A central transceiver of the CDPD system, that may be located proximate to a local cellular base station, may transmit a marker signal on unused cellular channels while monitoring a cellular control channel for channel assignments. The marker causes remote transceivers (e.g., vehicle data collection units 10) to scan for and monitor channels with detected marker signals. The vehicle collection units 10 remain on the marked channel so long as a marker signal is present and, in doing so, are able to transceive messages with the central transceiver of the CDPD system.

By monitoring the cellular control channel the CDPD system has advance indication that the marker channel is about to be allocated within the cellular voice system. When the CDPD central system detects that a cellular channel is about to be allocated within the cellular system, the CDPD system simply moves to another unoccupied cellular channel. When the remote transceivers detect an absence of the marker signal, the remote transceivers simply scan for a new marker signal on another unoccupied cellular channel.

Communication on the CDPD system is two-way and is based upon an ID address. Each remote transceiver 10 receives each packet and decodes the IP address. IF the packet is addressed to the remote 10 then the remote decodes the rest of the packet. If not, the remote 10 simply discards the packet.

Similarly the central CDPD transceiver 42 receives every packet transmitted by a remote transceiver 10 within range of the central transceiver 42. Unlike the remote 10, however, after the central transceiver 42 decodes the IP address, the central transceiver 42 must route the packet to its intended target. The central transceiver 42 routes the packet by comparing a received IP address with a routing table (not shown). The routing table identifies to the central transceiver 42 the appropriate trunk line through which to forward the received packet. Similarly the PSTN 40, also by reference to a routing table, determines that a packet received from a remote transceiver 10 is to be routed to the computer 38 by reference to the IP address within the packet and to a routing table.

The central data collection unit 30 may be programmed to collect data from each of the vehicle collection units 10 at predetermined time intervals (e.g., once every 30 days). Where a large organization is involved, with many vehicles, the central computer 38 may sequentially transmit information requests to vehicle collection units 10 followed by a time interval provided after each transmission for receipt of a response. Where a vehicle does not respond (or does not hear the information request) the central computer 38 retransmits the information request after a time period.

Under the embodiment, the central computer 38, upon receiving a response, stores the received indicia of use in a vehicle file associated with an ID of the response and sets a flag indicating a need for further processing. At predetermined intervals, the computer 38 processes each file to generate a maintenance schedule based upon usage threshold levels for the benefit of a maintenance support staff. To generate a maintenance schedule the computer 38 retrieves the latest indicia of usage and compares the indicia (miles or hours) with a predetermined maintenance value. Where the indicia of usage meets or approaches the pre-set maintenance value, the computer 38 generates a report listing an identifier of the vehicle (make, model, etc.) and the necessary maintenance procedure.

Turning now to the vehicle collection unit 10, a description will now be offered as to features and operating characteristics of the vehicle collection unit 10. Further explanation will also be offered as to the central data collection unit 30 insofar as necessary to understand the interaction between the vehicle collection unit 10 and central data collection unit 30.

As shown in FIG. 1, the vehicle collection unit 10 interfaces with the monitored vehicle through a vehicle interface 22. The vehicle interface 22 may be a single pair of conductors providing a contact closure or opto-isolated signal upon activation of the vehicle. Where the vehicle is battery powered, indication of vehicle activation may be provided by a limit switch mechanically connected to a throttle lever. Where the vehicle is gasoline or diesel powered equipment, the indication of vehicle activation may be provided by a contact interconnected with an ignition switch.

The interface 22 may also be several pairs of conductors for monitoring multiple functions such as vehicle activation or speed above a certain threshold, or it may be a data bus interfacing with a vehicular engine control computer providing data on mobile operation that may be used under an appropriate algorithm to generate a profile of the vehicle operating environment.

Where the indicia of usage from the vehicle interface 22 is an on-off signal simply providing indication of vehicle activation time (i.e., whenever the signal is "on") then the control 18 functions as a time keeper accumulating time whenever the vehicle is activated. In such a case, the controller 18 activates an internal counter (clock) 16 under an appropriate time base whenever the interface signal 22 is enabled and deactivates the counter whenever the interface signal 22 is disabled. The current count may be held in a non-volatile memory 16 and be incremented by the controller 18 at regular intervals (e.g., every minute, or second, or fraction thereof) using known methods.

The indicia of vehicle use may also be miles driven and may be provided by an odometer output or from an electronic speed control. In such a case the counter (clock 16) may be incremented by an electric signal caused by rotation of a mileage indicating component of the transmission, in turn, activating a maganetic sensor.

Periodically, the controller 18 of the vehicle collection unit 10 receives information requests from the central computer 38 through the transceiver 20. Under CDPD, information exchanged between the vehicle collection unit 10 and central computer 30 is packet data transferred over a packet switched network. As such, each packet transferred over the network contains a header which contains the ID of the communication target (i.e., vehicle collection unit 10 or central computer 30) depending on the direction of data flow.

As each packet is received by the transceiver 20 of the vehicle collection unit 10, the packet contents are reduced to a baseband signal within the transceiver 20 and transferred to the controller 18. The controller 18 compares the transmitted ID located within the received packet to an ID of the vehicle collection unit 10 stored within ROM 12. Where no match is found, the controller 18 discards the packet and continues along the path of normal processing (e.g., accumulating the indicia of use through the vehicle interface 22).

Where a match is found identifying the vehicle collection unit 10 as the communication target, the contents of the packet are then examined for a specific instruction from the central computer 38. The specific instruction of the data packet may be an identifier of a location of a specific subroutine stored within ROM 12. The specific subroutine may provide a communication check wherein the vehicle collection unit 10 simply responds by transmitting a data packet to the central computer 38 thereby informing the central computer 38 that the vehicle collection unit 10 is active and within range of a cellular base station of the cellular system 42.

Under the embodiment, the ID of the source of the transmission may be included in each data packet so that the data collection unit 10 can identify a transmission source or the vehicle collection unit 10 may retrieve the ID of the central computer 38 from ROM 12.

Under the embodiment, where the vehicle collection unit 10 receives a packet from a requester (e.g., central computer 38) addressed to the unit 10 requesting indicia of usage, the controller 18 retrieves such information from RAM 14, along with the ID of the requester 38 and composes a data packet in response to the request. Contained within the packet is an ID identifying the requester 38 as the communication target of the transmission. Contained within the body of the packet is the data requested (e.g., the contents of the clock 16) and the ID of the transmitting data collection unit 10.

Also contained within the packet is a data field specifying packet length. Since the maximum allowed packet length within the CDPD system is 2000 characters, it is clear that the indicia of use (and the data packet) may be of virtually any size and may contain a value of the indicia of use ranging from a value accumulated since the last read cycle to a totalized value accumulated since a time of the vehicle's manufacture.

Upon completion of the creation of a response packet, the vehicle collection unit 10 transfers the packet to the transceiver 20. The transceiver 20 encodes the packet under an appropriate modulation format on a selected transmission channel and transmits the packet to a nearby cellular base station of the cellular system 42. The cellular system 42, in turn, decodes the header of the packet and routes the packet based upon the ID of the packet through the PSTN 40 to the central computer 38.

Under another embodiment of the invention an optional global position system (GPS) 24 is used as an adjunct to usage monitoring to locate a vehicle to be serviced. The GPS 24 may be any of a number of portable GPS systems currently available such as the one available from Motorola, Inc.

To locate a vehicle, the central computer 38, upon determining a need, transmits an information request to the vehicle data collection unit 10 containing a location request. The controller 18 of the vehicle data collection unit 10 upon decoding the information request, uses the location request to identify a GPS access routine within ROM 12. Using the access routine, the controller 18 accesses the GPS 24 for a current location of the vehicle and composes a location response for transmission back to the central computer 38.

In another embodiment, the indicia of use includes certain parameters associated with engine condition. Under the embodiment, an engine sensor provides an output of an engine oil level. Another set of sensors provide indication of transmission fluid level and/or radiator fluid level. A further set of sensors may provide indication of engine block temperature. A further sensor 19 may provide an indication of battery charge level. Under the embodiment, the data collection unit 10 may transmit a summary of indicia back to the central computer 38 with each parameter assigned to a specific data field or the data collection unit 10 may respond with a specific indicia based upon a specific received command.

In another embodiment, the data collection unit 10 transmits indicia of usage based on operator performance. Under the embodiment, the data collection unit 10 records certain operating usage parameters for transmission back to the central computer 38. If the vehicle has an internal combustion engine, the parameter may be a maximum revolutions per minute (RPM) of the engine over a time period. Maximum braking rate may be reported. The operator may also be required to visually examine the vehicle for safety defects and certify to the operability of the vehicle by periodically activating a special "Safety Inspection" button.

A specific embodiment of novel apparatus of collecting vehicle usage information according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. An apparatus for remotely collecting and periodically reporting an indica of use of a vehicle to a central station through a cellular communication network, such apparatus comprising:

a safety inspection button which may be activated by an operator of the vihicle indicting that the operator has inspected the vehicle for safety defects and certified to an operability of the vehicle;

a vehicle use sensor coupled to the safety inspection button and to a power unit of the vehicle which detects an indicia of use of the power unit;

an indicia of vehicle use register operably coupled to the vehicle use sensor of the vehicle which contains a file of accumulated vehicle use including safety inspections for periodically transmission to the central station; and a wireless cellular transceiver of the cellular network coupled to the register and having a cellular identifier, said cellular transceiver being disposed to selectively activate for transmitting indicia of vehicle use to the central station only in response to a periodically received information request coded with the cellular identifier of the cellular transceiver.

2. The apparatus as in claim 1 further comprising a controller coupled to the cellular transceiver and register for decoding the received information request for a communication target identifier and for transmitting the current indicia of vehicle use upon finding a match between the received communication target identifier and an internal vehicle identifier.

3. The apparatus as in claim 2 further comprising a memory for storing the cellular identifier.

4. The apparatus as in claim 1 wherein the cellular transceiver further comprises a packet data transceiver.

5. The apparatus as in claim 1 wherein the indicia of vehicle use register further comprises a timer coupled to a vehicle activation switch.

6. The apparatus as in claim 1 wherein the indicia of vehicle use further comprises a counter coupled to mileage indicator.

7. The apparatus as in claim 1 further comprises a global positioning system coupled to and providing geographical position as an indicia of vehicle use for transmission to the central station.

8. The apparatus as in claim 1 wherein the indicia of vehicle use further comprises an output of a crankcase oil level sensor.

9. The apparatus as in claim 1 wherein the indicia of vehicle use further comprises an output of a transmission fluid level sensor.

10. The apparatus as in claim 1 wherein the indicia of vehicle use further comprises an output of a radiator fluid level sensor.

11. The apparatus as in claim 1 wherein the indicia of use further comprises an output of a battery charge level sensor.

12. The apparatus as in claim 1 wherein the indicia of use further comprises a vehicle engine revolutions per minute indication.

13. The apparatus as in claim 1 wherein the indicia of use further comprises a vehicle braking rate.

14. The apparatus as in claim 1 wherein the indicia of use further comprises a vehicle safety check complete indicator.

15. A system for collecting an indicia of vehicle use from a plurality of remotely located vehicles through a cellular communications network comprising:

a central computer which periodically transmits an information request to a vehicle of the plurality of remotely located vehicles through the cellular network using a cellular identifier;

a cellular transceiver having a cellular identifier, said cellular transceiver disposed on the vehicle; and, a vehicle information collection unit coupled to a power unit of the vehicle and to the cellular transceiver;

a safety inspection button coupled to the vehicle information collection unit which may be activated by an operator of the vehicle indicating that the operator has inspected the vehicle for safety defects and certified to an operability of the vehicle and wherein the vehicle information collection unit responds to the information request though the cellular transceiver with indicia of accumulated vehicle use including safety inspections only when the cellular identifier of the information request matches the cellular identifier of the cellular transceiver.

16. The system as in claim 15 wherein the vehicle collection unit and cellular transceiver further comprises a unitary assembly.

17. The system as in claim 15 wherein the vehicle collection unit further comprises an indicia of vehicle use register.

18. The system as in claim 17 wherein the indicia of vehicle use register further comprises a timer controlled by vehicle use.

19. The system as in claim 17 wherein the indicia of vehicle use register further comprises a counter activated by the vehicle mileage indicator.

20. The system as in claim 17 wherein the vehicle information collection unit further comprises a global position sensor.

21. The system as in claim 17 wherein the indicia of vehicle use register further comprises a global position sensor register.

22. The system as in claim 17 wherein the cellular transceiver further comprises a packet data transceiver.

23. A system for collecting maintenance information from a plurality of remotely located mobile vehicles through a wireless cellular communication network, such system comprising:

a central station which periodically polls each mobile vehicle of the plurality of remotely located mobile vehicles through the wireless cellular network by transmitting a plurality of information requests each containing a cellular identifier of a particular mobile vehicle;

a data collection unit disposed on each mobile vehicle of the plurality of mobile vehicles further comprising:

a vehicle use sensor coupled to a power unit of the vehicle which may be activated by an operator of the vehicle indicating that the operator has inspected the vehicle for safety defects and certified to an operability of the vehicle;

an indicia of vehicle use register operably coupled to the vehicle use sensor of the mobile vehicle and which contains a file of accumulated indicia of vehicle use;

a cellular transceiver operably coupled to the vehicle use register and having an internal cellular identifier, such cellular transceiver configured to selectively activate and transmit indicia of vehicle use to the central station in a transmission including a cellular identifier of the central station only upon detection of an information request received through the cellular network from the central station and encoded with the cellular identifier of the cellular transceiver.

24. The system for collecting maintenance information from a plurality of mobile vehicles as in claim 23 wherein the cellular transceiver further comprises a scanner for scanning cellular channels for information requests.

* * * * *